(12) United States Patent
Schmitz et al.

(10) Patent No.: US 10,924,014 B2
(45) Date of Patent: Feb. 16, 2021

(54) SWITCHING REGULATOR CONTROLLER DYNAMIC OUTPUT VOLTAGE ADJUSTMENT

(71) Applicant: Alpha and Omega Semiconductor (Cayman) Ltd., Grand Cayman (KY)

(72) Inventors: Richard Schmitz, San Tan Valley, AZ (US); Edward Mun Lam, Fremont, CA (US); Daniel Edward Brown, Newark, CA (US)

(73) Assignee: Alpha and Omega Semiconductor (Cayman) Ltd., Grand Cayman (KY)

( * ) Notice: Subject to any disclaimer, the term of this patent is extended or adjusted under 35 U.S.C. 154(b) by 0 days.

(21) Appl. No.: 16/291,876

(22) Filed: Mar. 4, 2019

(65) Prior Publication Data

US 2020/0287459 A1 Sep. 10, 2020

(51) Int. Cl.
*H02M 3/157* (2006.01)
*H02M 3/158* (2006.01)
(Continued)

(52) U.S. Cl.
CPC ............. *H02M 3/157* (2013.01); *H02M 1/08* (2013.01); *H02M 3/158* (2013.01); *H02M 3/1584* (2013.01); *H02M 2001/0009* (2013.01)

(58) Field of Classification Search
CPC ............ H02M 3/00; H02M 3/02; H02M 3/04; H02M 3/10; H02M 3/145; H02M 3/155; H02M 3/156; H02M 3/1563; H02M 3/157; H02M 3/158; H02M 3/1584; H02M 3/1588; H02M 1/08; H02M 2001/0009; H02M 2001/0012; H02M 2001/0025; H02M 2003/1566; H02M 1/082; H02M 1/0845; H02M 7/53873; H02M 2001/0048; H02M 3/135; H02M 3/137; H02M 3/139; H02M 3/33515; H02M 3/33546; H02M 3/1582; Y02B 70/10; Y02B 70/14; Y02B 70/1458; Y02B 70/1466; Y02B 70/16
(Continued)

(56) References Cited

U.S. PATENT DOCUMENTS

| 5,428,342 A * | 6/1995 | Enoki ................ G08B 21/0423 340/12.32 |
| 8,067,928 B2 * | 11/2011 | Nakamura .......... H02M 3/1588 323/283 |

(Continued)

*Primary Examiner* — Thienvu V Tran
*Assistant Examiner* — Carlos O Rivera-Perez
(74) *Attorney, Agent, or Firm* — Carmen C. Cook

(57) ABSTRACT

A controller for a switching regulator includes an error amplifier configured to receive a feedback voltage indicative of the regulated output voltage and a reference voltage, and to generate an error signal indicative of the difference between the feedback voltage and the reference voltage; a loop calculator configured to generate an output signal in response to the error signal, the output signal being used by the switching regulator to generate the regulated output voltage having a voltage value related to the reference voltage; and an output voltage adjust circuit configured to receive a sense current signal indicative of a current flowing through the load and to generate a voltage adjust signal in response to the sense current signal, the voltage adjust signal being applied to generate the reference voltage relative to a predetermined set voltage.

22 Claims, 14 Drawing Sheets

(51) Int. Cl.
*H02M 1/08* (2006.01)
*H02M 1/00* (2006.01)

(58) Field of Classification Search
USPC ........ 323/222–226, 265, 271–275, 280–285,
323/351, 909; 363/74, 78, 79, 123, 124
See application file for complete search history.

(56) References Cited

U.S. PATENT DOCUMENTS

| | | | |
|---|---|---|---|
| 9,219,415 B2* | 12/2015 | Sugiyama | H02M 3/156 |
| 9,973,083 B1* | 5/2018 | Rose | H02M 3/156 |
| 2010/0001704 A1* | 1/2010 | Williams | H02M 3/157 |
| | | | 323/283 |
| 2011/0309811 A1* | 12/2011 | Kondo | H02M 3/1584 |
| | | | 323/282 |
| 2014/0125131 A1* | 5/2014 | Lalitnuntikul | H02J 7/04 |
| | | | 307/31 |
| 2016/0079758 A1* | 3/2016 | Pan | H02J 3/383 |
| | | | 307/82 |
| 2016/0126836 A1* | 5/2016 | Schmitz | H02M 3/157 |
| | | | 323/271 |
| 2018/0131266 A1* | 5/2018 | Rohr | H02M 1/12 |
| 2018/0234012 A1* | 8/2018 | You | H02M 3/1584 |

* cited by examiner

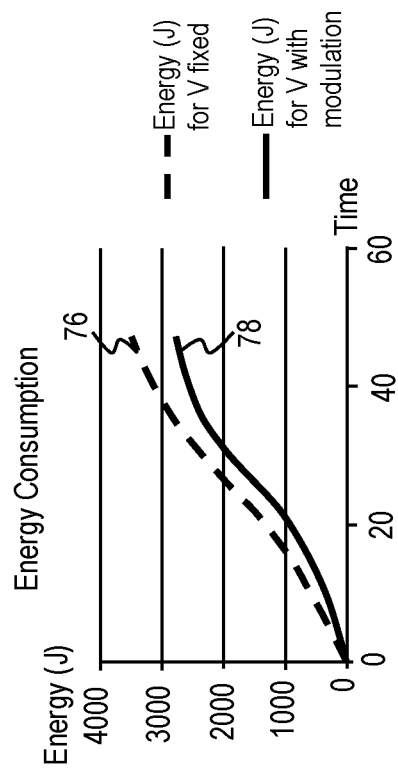
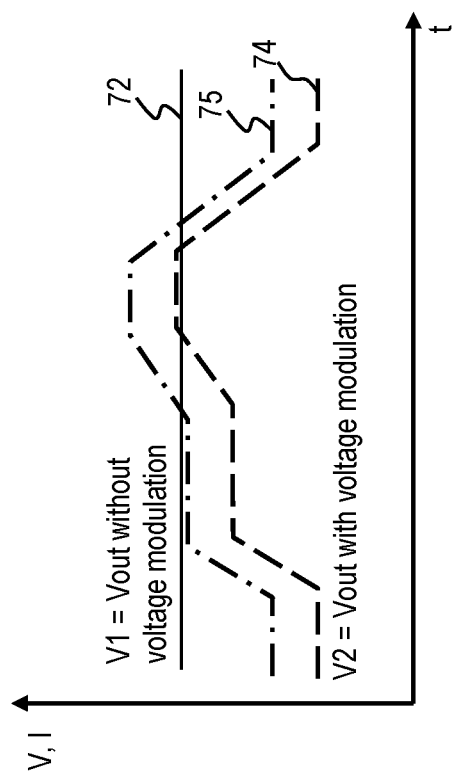
Fig. 2(b)
Fig. 2(a)

SWITCHING REGULATOR CONTROLLER DYNAMIC OUTPUT VOLTAGE ADJUSTMENT

BACKGROUND OF THE INVENTION

Many consumer electronic appliances, such as television set top boxes, laptops, desktops, gaming consoles, network processors and remote control devices, are implemented as electronic systems incorporating integrated circuits. Conventional electronic systems typically employ one or more DC-to-DC converters to convert a main bus voltage from a power source supplying the system to one or more voltages necessary for driving these integrated circuits as the load.

Switch mode power supplies or switching regulators, also referred to as DC-to-DC converters, are used to convert an input supply voltage to a desired output voltage at a voltage level appropriate for integrated circuits in an electronic system. For example, a 12 volts supply voltage provided to an electronic system may need to be reduced to 5 volts for supplying the I/O interface circuits and reduced to 1V for supplying the core digital logic circuits, especially if the core digital logic circuits are built using deep sub-micron integrated circuits. A switching regulator provides power supply function through low loss components such as capacitors, inductors, and transformers, and power switches that are turned on and off to transfer energy from the input to the output in discrete packets. A feedback control circuit is used to regulate the energy transfer to maintain a constant output voltage within the desired load limits of the circuit.

Electronic systems implement energy management to optimize the energy consumption. For instance, the load provides a signal to the controller of the switching regulator to direct the controller to change the voltage value of the regulated output voltage. Accordingly, the output voltage of the switching regulator is responsive to the load demand to optimize energy consumption.

BRIEF DESCRIPTION OF THE DRAWINGS

Various embodiments of the invention are disclosed in the following detailed description and the accompanying drawings.

FIGS. 2(a) and 2(b) illustrate implementation of an energy management scheme and the corresponding energy consumption measurements in some examples.

DETAILED DESCRIPTION

According to embodiments of the present disclosure, a controller for a switching regulator implements dynamic output voltage adjustment by generating a voltage adjust signal to modulate the regulated output voltage in response to a sense current indicative of the load current. More specifically, the voltage adjust signal is applied to generate the reference voltage for setting the regulated output voltage of the switching regulator. In some embodiments, the controller incorporates an output voltage adjust circuit to adjust the regulated output voltage of the switching regulator in response to the load current. In this manner, the regulated output voltage of the switching regulator can be set to the optimal value based on the demand of the load to optimize energy consumption. Importantly, the controller adjusts the regulated output voltage of the switching regulator independent of any feedback control signals from the load. Regardless of the feedback control capability of the load, the controller of the present invention is capable of achieving optimal energy consumption by adjusting the regulated output voltage provided to the load based on the load current.

The switching regulator controller of the present invention realizes many advantages over conventional solutions. First, the controller of the present invention is capable of adjusting the regulated output voltage of the switching regulator using only the load current and without relying on any feedback control signal from the load or from the system processor of the electronic system in which the switching regulator is incorporated. The controller can be advantageously applied to electronic systems where the load does not have capability of provided feedback control signal to the controller. The controller can provide energy management for those loads lacking the ability to provide feedback control signal to adjust the regulated output voltage. The energy management is done at the controller independent of any feedback control from the load or the system processor. In particular, the controller of the present invention provides energy management to optimize energy consumption without requiring the controller to have interaction with the load at runtime and without requiring any supervision from the system processor to set the desired modulated voltage values. Finally, the controller of the present invention can be applied to realize optimal energy consumption as the regulated output voltage is adjusted based on load demand, that is, based on the demand of the tasks running on the load.

Figure 1:
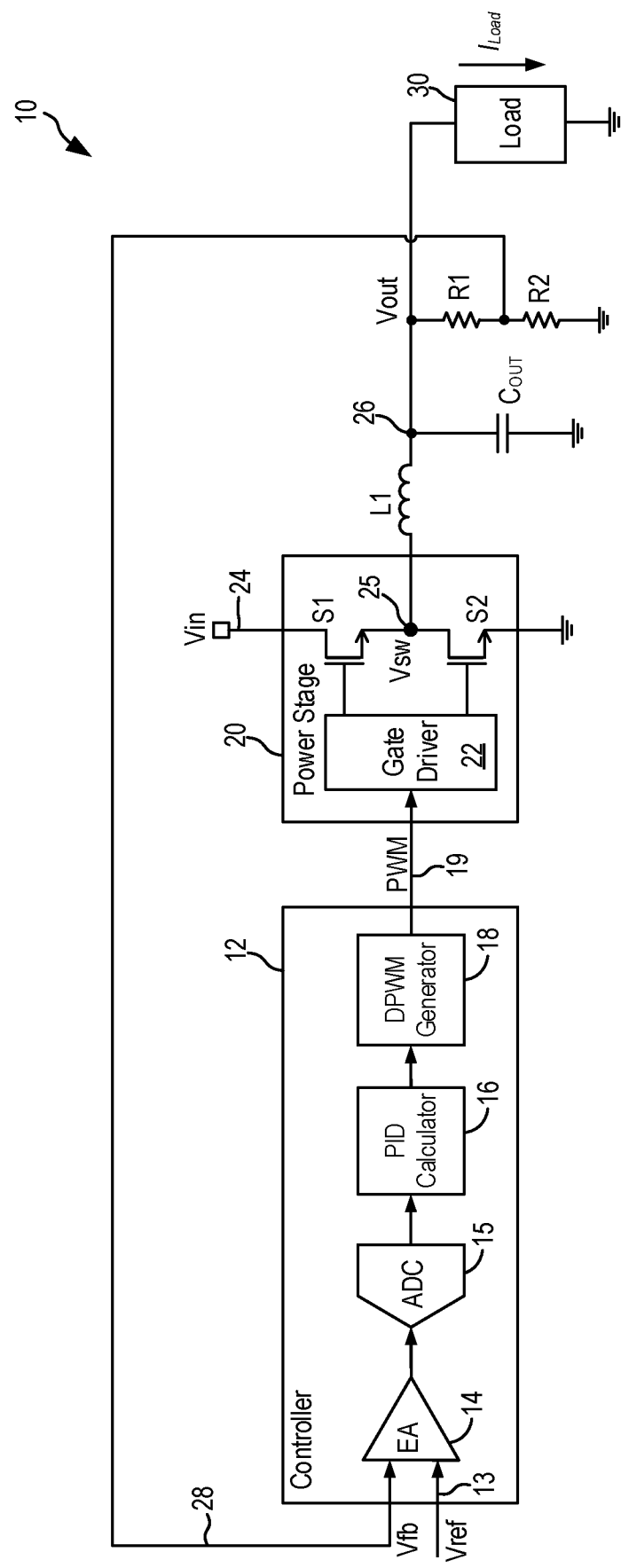
FIG. 1 is a schematic diagram of a switching regulator in some examples.

FIG. 1 is a schematic diagram of a switching regulator in some examples. Referring to FIG. 1, a switching regulator 10 includes a switching regulator controller ("controller") 12 and a power stage 20. Power switches S1 and S2 in the power stage 20 are driven by a gate driver 22 to alternately turn on and off to generate a switching output voltage $V_{SW}$ at a switch node 25. The switching output voltage $V_{SW}$ is coupled to an LC filter circuit including an output inductor L1 and an output capacitor $C_{OUT}$ to generate a regulated output voltage Vout at node 26 having a substantially constant magnitude. The output voltage Vout can then be used to drive a load 30 whereby switching regulator 10 provides the load current $I_{LOAD}$ to maintain the output voltage Vout at a constant level. In the present embodiment, power switches S1 and S2 are both N-type MOSFET devices. In other embodiments, power switch S1 may be implemented using a P-type MOSFET device with the appropriate reversal in control voltage polarity.

Switching regulator 10 includes a feedback control circuit to regulate the energy transfer to the LC filter circuit to maintain a constant output voltage within the desired load limits of the circuit. More specifically, the feedback control circuit causes power switches S1 and S2 to turn on and off to regulate the output voltage Vout to be equal to a reference voltage Vref or to a voltage value related to the reference voltage Vref. In the present example, a voltage divider including resistors R1 and R2 is used to divide down the output voltage Vout which is then fed back to the switching regulator controller 12 as a feedback voltage Vfb on a feedback node 28. In other examples, the voltage divider may be omitted. That is, the feedback voltage Vfb can be the regulated output voltage Vout or a divided down voltage of the regulated output voltage Vout. At the controller 12, the feedback voltage Vfb is compared with the reference voltage Vref at an error amplifier 14. The error amplifier 14 generates an error signal being the difference between the feedback voltage Vfb and the reference voltage Vref. In the present example, the error signal is digitized by an analog-to-digital converter (ADC) 15. Furthermore, in the present example, the digitized error signal is provided to a proportional—integral—derivative (PID) calculator 16 and a digital pulse-width-modulation (PWM) generator 18 to generate the PWM control signal (node 19) for driving the power switches in the power stage 20. In response to the PWM control signal, the gate driver circuit 22 generates gate drive signals for the power switches S1 and S2. In particular, the gate driver circuit 22 converts the PWM control signal to gate drive voltages appropriate for turning on and off the respective power switches.

As thus configured, the controller 12 generates the PWM control signal for driving the power switches to regulate the regulated output voltage Vout to the desired voltage value as set by the reference voltage Vref. It is instructive to note that the construction of the switching regulator of FIG. 1 is illustrative only and not intended to be limiting. Other configuration of the switching regulator can be used. The construction of the switching regulator or the specific feedback control scheme used are not critical to the practice of the present invention.

Electronic systems incorporating switching regulators often implement energy management schemes to optimize the energy consumption. In particular, it is advantageous to set the voltage value of the regulated output voltage to the lowest value required by the load demand so as to minimize energy consumption. FIGS. 2(a) and 2(b) illustrate implementation of an energy management scheme and the corresponding energy consumption measurements in some examples. FIG. 2(a) illustrates the regulated output voltage and the load current under different modulation conditions. FIG. 2(b) illustrates the energy consumption over time for the corresponding modulation conditions.

Referring to FIG. 2(a), in some cases, a fixed regulated output voltage is used (curve 72), that is, a regulated output voltage without voltage modulation. Accordingly, a high voltage value has to be used for the fixed regulated output voltage to ensure sufficient load current supply for all load conditions. In cases where energy management is applied to modulate the regulated output voltage (curve 74), the regulated output voltage varies over time in accordance with the load demand, as illustrated by the variations in the load current (curve 75). Referring to FIG. 2(b), the energy consumption over time for the case with the fixed, unmodulated output voltage (curve 76) and the case with the modulated output voltage (curve 78) are shown. It can be observed that by modulating the regulated output voltage of the switching regulator, the energy consumption over time can be reduced.

Figure 3:
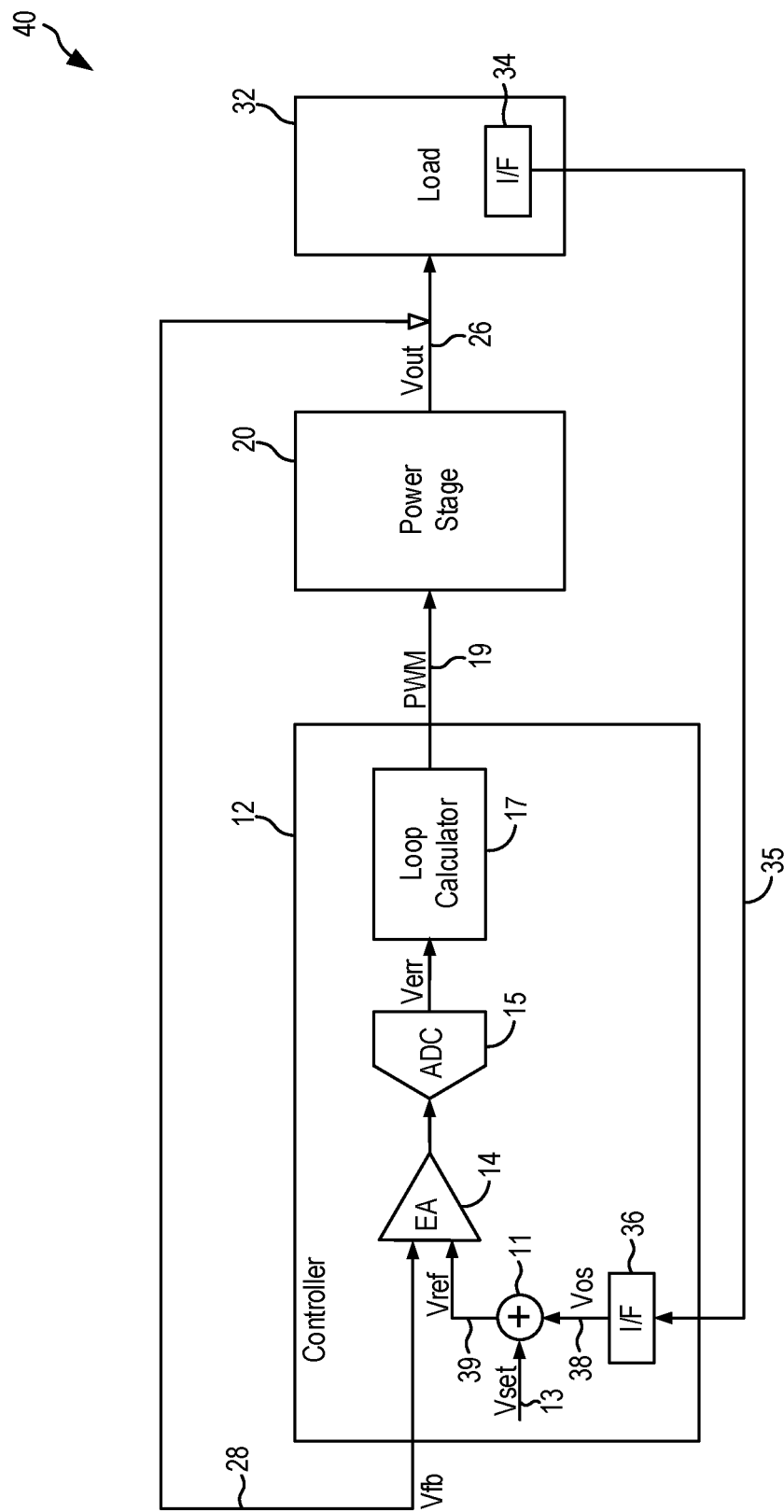
FIG. 3 is a schematic diagram of a conventional switching regulator implementation in some examples.

Conventional electronic systems rely on the load to provide a feedback control signal to the switching regulator to change the voltage value of the regulated output voltage to a desired value for optimizing energy consumption. FIG. 3 is a schematic diagram of a conventional switching regulator implementation in some examples. FIG. 3 illustrates a switching regulator 40 in a simplified manner and certain elements of the switching regulator, such as the LC filter circuit, are omitted to simplify the discussion. It is understood that the switching regulator 40 may be implemented in the same manner as the switching regulator 10 shown in FIG. 1 or in other configurations. Referring to FIG. 3, a switching regulator 40 is configured to drive a load 32. The switching regulator 40 includes a controller 12 driving a power stage 20 providing a regulated output voltage Vout on node 26. A feedback voltage Vfb (node 28), indicative of the regulated output voltage Vout, is provided to the error amplifier 14 in the controller 12 to be compared with the reference voltage Vref (node 39). The feedback voltage Vfb can be the regulated output voltage Vout or a divided down voltage of the regulated output voltage Vout. The error signal generated by the error amplifier is digitized by the ADC 15 and then provided to the loop calculator 17 to generate the PWM control signal (node 19). The loop calculator 17 can be implemented as a PID calculator and a PWM generator, as shown in FIG. 1. The PWM control signal is provided to drive the power stage 20 to generate the regulated output voltage Vout. In operation, the control loop of the switching regulator operates to achieve the operating point where the error signal is zero. That is, the control loop modulates the PWM control signal to turn the power stage on and off until the feedback voltage Vfb is the same as the reference voltage Vref.

In switching regulator 40, the reference voltage Vref has a voltage value related to a set voltage Vset (node 13). The set voltage Vset can be a voltage value set by electronic system or a predetermined output voltage value for the switching regulator 40. To implement energy management, the load 32 provides a feedback control signal to the switching regulator 40 to adjust the voltage value of the regulated output voltage Vout. In particular, the load 32 includes a communication interface 34 to provide the feedback control signal (node 35) to a communication interface 36 of the controller 12 of the switching regulator. The feedback control signal contains a voltage offset value Vos (node 38) which is summed with the set voltage Vset, such as using a summer 11, to generate the reference voltage Vref. In this manner, the voltage offset value Vos, provided by the load 32, is used to adjust the reference voltage Vref and the regulated output voltage is thus modulated as directed by the load 32.

The conventional energy management scheme requires the load to communicate to the switching regulator controller the desired output voltage modulation. In other words, the load 32 controls operation parameters of the controller 12. For example, the load 32 may direct the controller to modulate the regulated output voltage to 1.8V, 1.65V or 1V. However, in some cases, the conventional energy management scheme cannot be used. For example, some electronic systems do not have the capability of providing a feedback control signal to modulate the regulated output voltage. In that case, the switching regulator provides a fixed regulated output voltage which may result in undesirable level of energy consumption.

According to embodiments of the present invention, a switching regulator controller implements an output voltage adjust circuit and method to generate a voltage adjust signal in response to a sense current indicative of the load current. In this manner, the switching regulator controller can operate to modulate the regulated output voltage to optimize energy consumption without requiring interaction with the load or any command from the load. The switching regulator controller can be advantageously applied to supply power to electronic systems that do not have the capability of providing a feedback control signal to modulate the output voltage. The switching regulator controller can modulate the regulated output voltage to optimize energy consumption regardless of the capability of the load. In other words, the switching regulator controller can modulate the regulated output voltage without relying on the load to provide feedback control signals.

Figure 4:
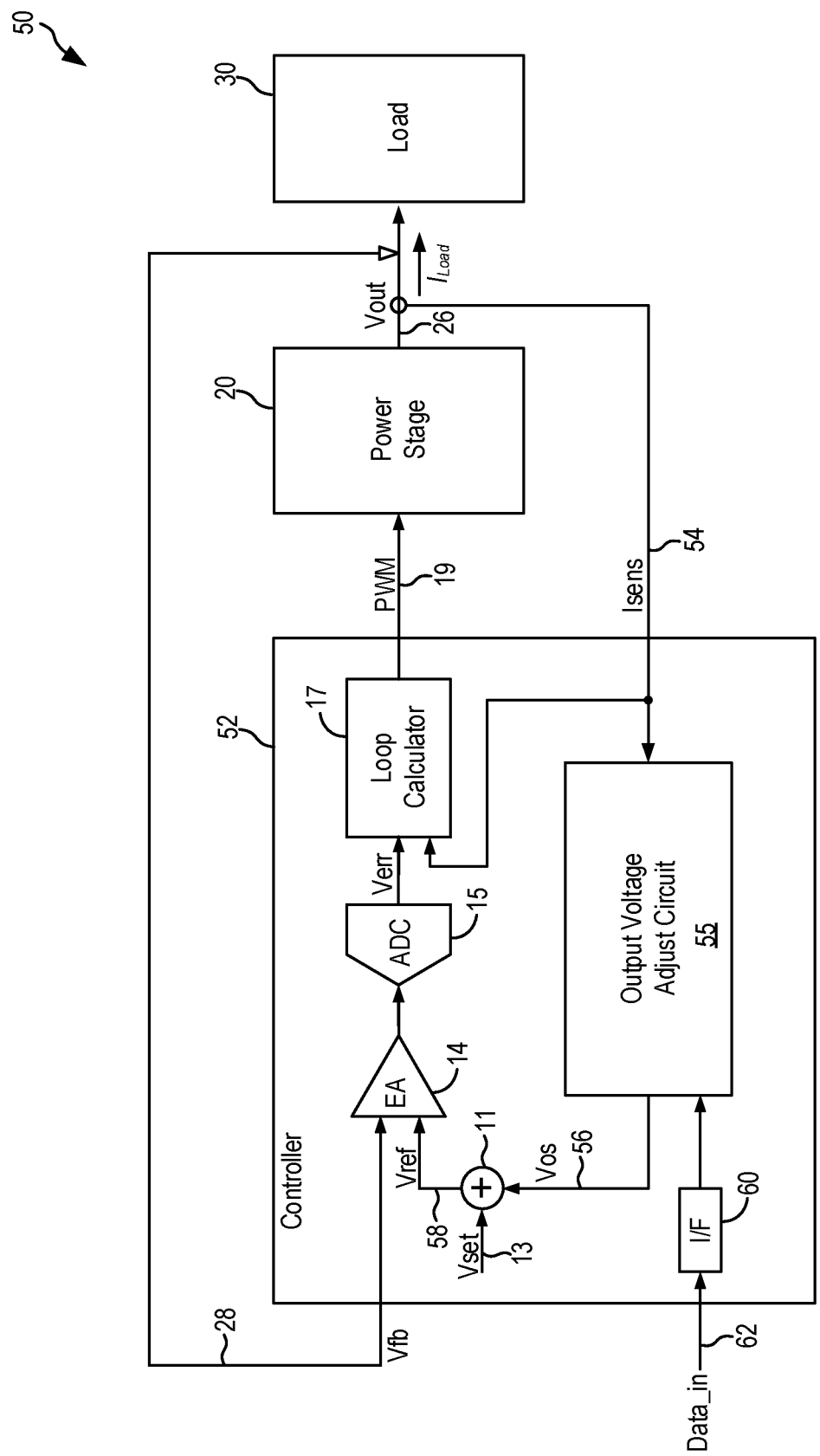
FIG. 4 is a schematic diagram of a switching regulator incorporating an output voltage adjust circuit in some embodiments of the present invention.

FIG. 4 is a schematic diagram of a switching regulator incorporating an output voltage adjust circuit in some embodiments of the present invention. FIG. 4 illustrates a switching regulator 50 in a simplified manner and certain elements of the switching regulator, such as the LC filter circuit, are omitted to simplify the discussion. It is understood that the switching regulator 50 may be implemented in the same manner as the switching regulator 10 shown in FIG. 1 or implemented using other switching regulator configurations. The specific configuration of the switching regulator is not critical to the practice of the present invention.

Referring to FIG. 4, a switching regulator 50 is configured to drive a load 30. The switching regulator 50 includes a switching regulator controller ("controller") 52 driving a power stage 20 providing a regulated output voltage Vout on node 26. A feedback voltage Vfb (node 28), indicative of the regulated output voltage Vout, is provided to the error amplifier 14 in the controller 12 to be compared with the reference voltage Vref (node 58). The feedback voltage Vfb can be the regulated output voltage Vout or a divided down voltage of the regulated output voltage Vout. The error signal generated by the error amplifier 14 is digitized by the ADC 15 and then provided to the loop calculator 17 to generate the PWM control signal (node 19). The loop calculator 17 can be implemented as a PID calculator and a PWM generator, as shown in FIG. 1. The PWM control signal is provided to drive the power stage 20 to generate the regulated output voltage Vout. In operation, the control loop of the switching regulator operates to achieve the operating point where the error signal is zero. That is, the control loop modulates the PWM control signal to turn the power stage on and off until the feedback voltage Vfb is the same as the reference voltage Vref.

In switching regulator 50, the reference voltage Vref has a voltage value based on a set voltage Vset (node 13). The set voltage Vset can be a voltage value set by electronic system or a predetermined output voltage value for the switching regulator 50. In embodiments of the present invention, the controller 52 includes an output voltage adjust circuit 55 to generate a voltage adjust signal Vos (node 56). The voltage adjust signal Vos is combined with the set voltage Vset to generate the reference voltage Vref which is relative to the set voltage. In FIG. 4, a summer 11 is shown for summing the voltage adjust signal Vos and the set voltage Vset. The use of a summer 11 is illustrative only and not intended to be limiting. In actual implementation, any circuitry for combining two voltage values may be used. In actual implementation, the voltage adjust signal Vos may be combined with the set voltage Vset by increasing or decreasing the set voltage Vset by an amount indicated by the voltage adjust signal Vos.

More specifically, the output voltage adjust circuit 55 receives a sense current signal Isens (node 54) indicative of the load current Load flowing through the load 30. The output voltage adjust circuit 55 provides the voltage adjust signal Vos in response to the sense current Isens. In some embodiments, the voltage value of the voltage adjust signal Vos corresponds to the current value of the sense current signal Isens. In other embodiments, the voltage adjust signal Vos may be a voltage pattern corresponding to a current pattern of the sense current signal Isens. The voltage adjust signal Vos adjusts the reference voltage Vref, which then adjusts the regulated output voltage Vout. In this manner, the regulated output voltage of the switching regulator 50 is modulated by using the sense current Isens and without any feedback control signal from the load 30.

In general, the controller 52 uses the sense current signal Isens in the feedback control loop for regulating the regulated output voltage Vout. That is, the sense current signal Isens may be a signal that is normally fed back to the controller 52 for determining the PWM control signal. In embodiments of the present invention, the same sense current signal is used by the output voltage adjust circuit 55 to modulate the reference voltage, thereby modulating the regulated output voltage.

In the present embodiment, the controller 52 includes a communication interface 60 to receive input data Data_In (node 62) from an external source, such as the system processor or a user input. The communication interface 60 is in communication with the output voltage adjust circuit 55 and provides the input data to the output voltage adjust circuit 55. In some embodiments, the communication interface 60 is used to update the voltage adjust signal values stored in the output voltage adjust circuit 55.

In embodiments of the present invention, the output voltage adjust circuit 55 in switching regulator controller 52 can be implemented in several configurations to provide dynamic output voltage adjustment in response to the sensed load current. In some embodiments, the output voltage adjust circuit is implemented as one or more current-voltage lookup tables. In other embodiments, the output voltage adjust circuit is implemented using current pattern analysis and matching.

Figure 5:
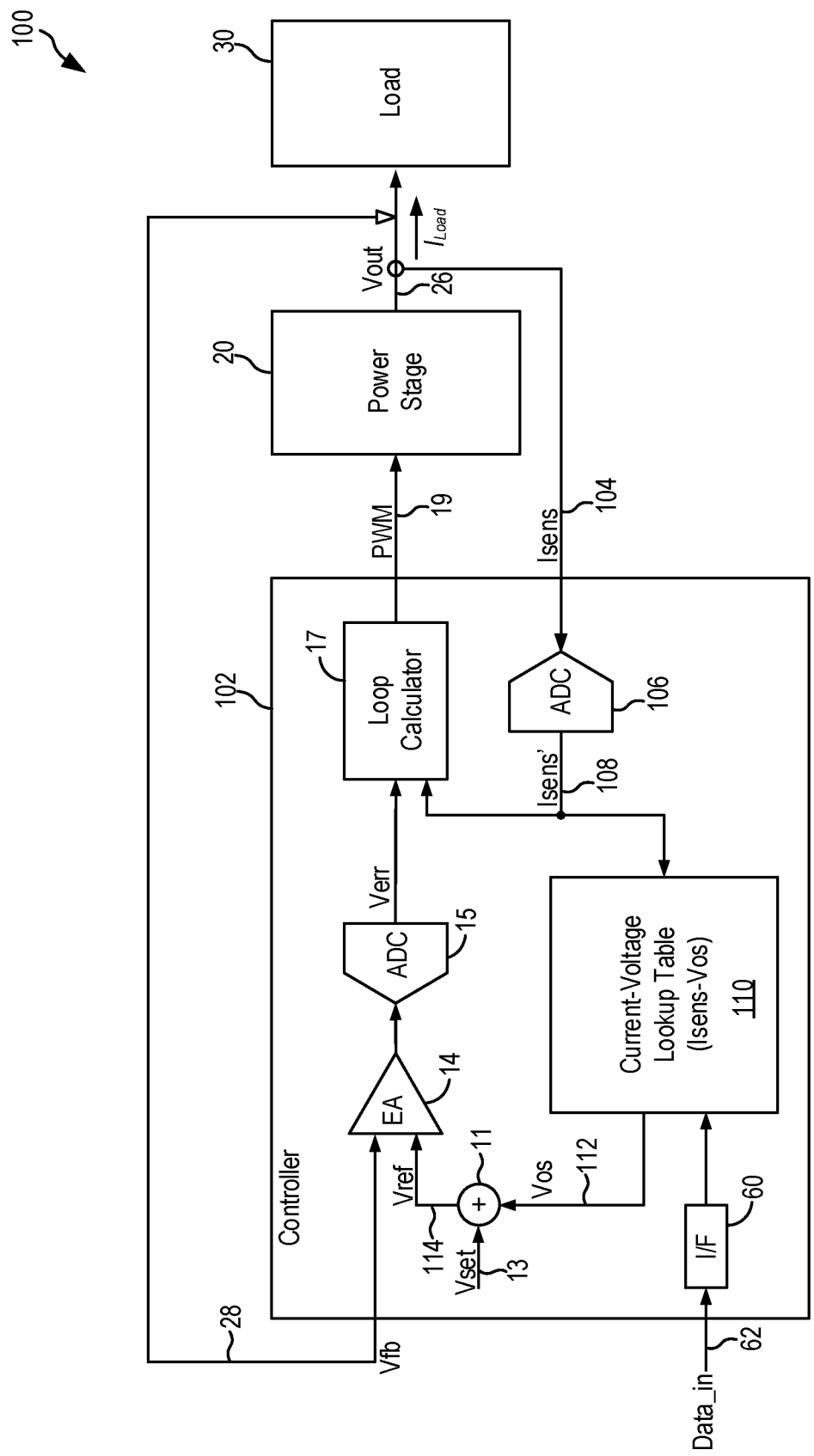
FIG. 5 is a schematic diagram of a switching regulator controller incorporating a current-voltage lookup table for dynamic output voltage adjustment in some embodiments of the present invention.

FIG. 5 is a schematic diagram of a switching regulator controller incorporating a current-voltage lookup table for dynamic output voltage adjustment in some embodiments of the present invention. In general, the switching regulator 100 in FIG. 5 is constructed in the same manner as the switching regulator 50 of FIG. 4. Like elements in FIGS. 4 and 5 are giving like reference numerals and discussion of like elements may be omitted. The switching regulator 100 in FIG. 5 is illustrated in a simplified manner and certain elements of the switching regulator, such as the LC filter circuit, are omitted to simplify the discussion. It is understood that the switching regulator 100 may include other elements to complete the circuit. Furthermore, it is understood that the switching regulator 100 may be implemented using other switching regulator configurations. The specific configuration of the switching regulator is not critical to the practice of the present invention.

Referring to FIG. 5 a switching regulator 100 is configured to drive a load 30. The switching regulator 100 includes a switching regulator controller ("controller") 102 driving a power stage 20 providing a regulated output voltage Vout on node 26. A feedback voltage Vfb (node 28), indicative of the regulated output voltage Vout, is provided to the error amplifier 14 in the controller 102 to be compared with the reference voltage Vref (node 114). The feedback voltage Vfb can be the regulated output voltage Vout or a divided down voltage of the regulated output voltage Vout. The error signal generated by the error amplifier 14 is digitized by the ADC 15 and the digitized error signal Verr is then provided to the loop calculator 17 to generate the PWM control signal (node 19). The loop calculator 17 can be implemented as a PID calculator and a PWM generator, as shown in FIG. 1. The PWM control signal is provided to drive the power stage 20 to generate the regulated output voltage Vout. In operation, the control loop of the switching regulator operates to achieve the operating point where the error signal Verr is zero. That is, the control loop modulates the PWM control signal to turn the power stage on and off until the feedback voltage Vfb is the same as the reference voltage Vref.

In switching regulator 100, the reference voltage Vref has a voltage value related to a set voltage Vset (node 13). The set voltage Vset can be a voltage value set by electronic system or a predetermined output voltage value for the switching regulator 100. In embodiments of the present invention, the controller 102 includes an output voltage adjust circuit 110 to generate a voltage adjust signal Vos (node 112). The voltage adjust signal Vos is combined with the set voltage Vset to generate the reference voltage Vref which is relative to the set voltage. In FIG. 5, a summer 11 is shown for summing the voltage adjust signal Vos and the set voltage Vset. The use of a summer 11 is illustrative only and not intended to be limiting. In actual implementation, any circuitry for combining two voltage values may be used. In actual implementation, the voltage adjust signal Vos may be combined with the set voltage Vset by increasing or decreasing the set voltage Vset by an amount indicated by the voltage adjust signal Vos.

More specifically, the output voltage adjust circuit 110 receives a sense current signal Isens (node 104) indicative of the load current $I_{Load}$ flowing through the load 30. In the present embodiment, the sense current signal Isens is digitized by an ADC 106 and the digitized sense current signal Isens' (node 108) is provided to the output voltage adjust circuit 110. The digitized sense current signal Isens' may also be provided to the loop calculator 17 for determining the PWM control signal.

The output voltage adjust circuit 110 provides the voltage adjust signal Vos in response to the sense current Isens or the digitized sample thereof. In the present embodiment, the output voltage adjust circuit 110 is implemented as a current-voltage lookup table. The current-voltage lookup table stores voltage values for the voltage adjust signal where each voltage value is associated with a sense current value. The current-voltage lookup table is indexed by the digitized sense current value Isens' and in response to the digitized sense current value, the current-voltage lookup table provides an output voltage value being the voltage adjust signal Vos (node 112). In this manner, the current-voltage lookup table is responsive to the load current demand and adjusts the regulated output voltage accordingly. As a result, real time or on-the-fly output voltage adjustment can be realized. Furthermore, the regulated output voltage can be adjusted dynamically for optimizing power consumption without interaction from the load or the system processor.

In the present embodiment, the controller 102 includes a communication interface 60 to receive input data Data_In (node 62) from an external source, such as the system processor or a user input. The communication interface 60 is in communication with the current-voltage lookup table 110. The communication interface 60 can be used to load data into the lookup table. Alternately, the communication interface 60 can be used to update data values stored in the lookup table. In one embodiment, the communication interface is implemented as a power management bus (PMBus).

Figure 6:
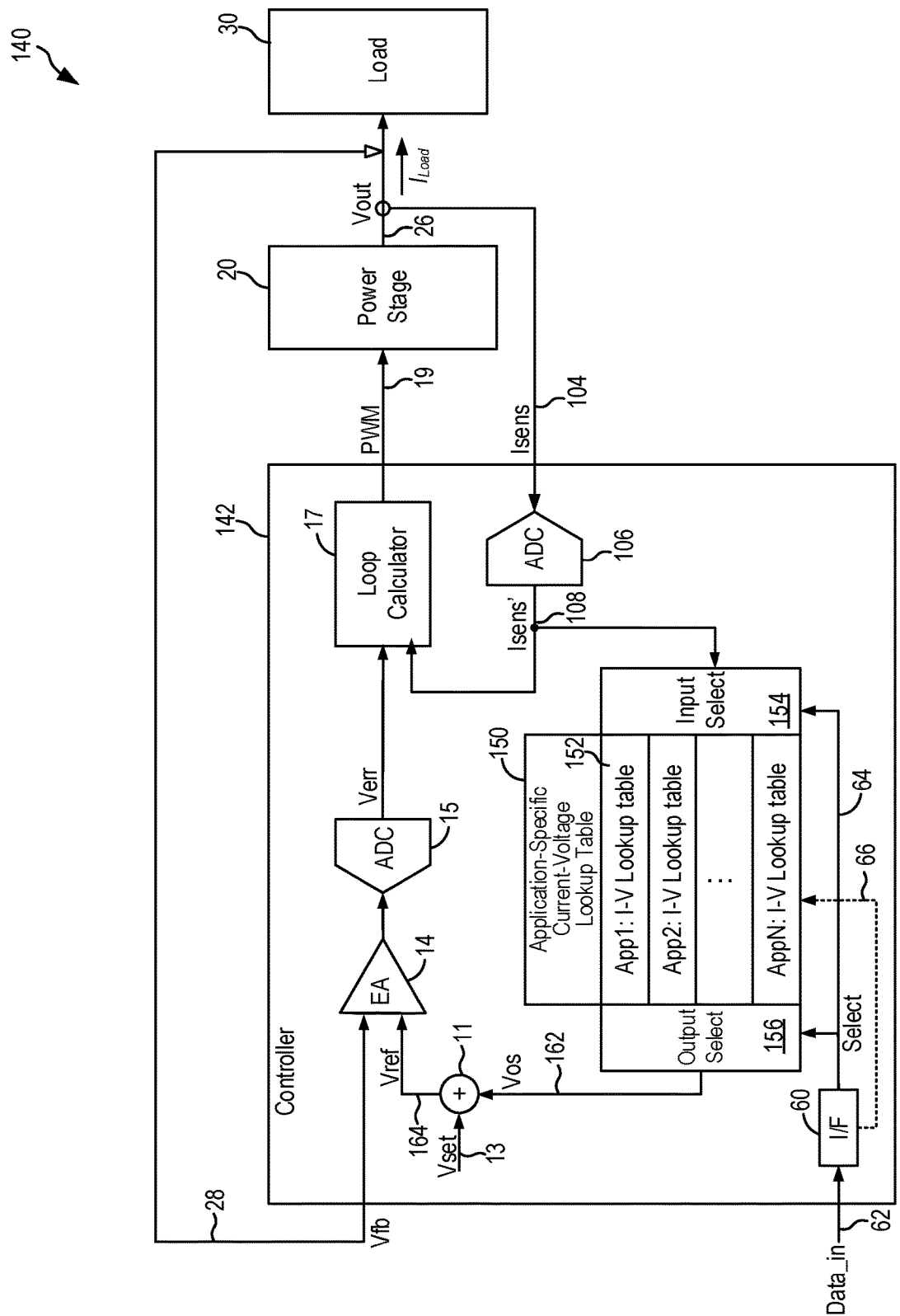
FIG. 6 is a schematic diagram of a switching regulator controller incorporating a set of current-voltage lookup tables for dynamic output voltage adjustment in some embodiments of the present invention.

In the embodiment shown in FIG. 5, controller 102 includes a single current-voltage lookup table 110 to implement dynamic output voltage adjustment. In other embodiments, the controller may include multiple current-voltage lookup table for different load profiles. FIG. 6 is a schematic diagram of a switching regulator controller incorporating a set of current-voltage lookup tables for dynamic output voltage adjustment in some embodiments of the present invention. In general, the switching regulator 140 in FIG. 6 is constructed in the same manner as the switching regulator 100 of FIG. 5. Like elements in FIGS. 5 and 6 are giving like reference numerals and discussion of like elements may be omitted. The switching regulator 140 in FIG. 6 is illustrated in a simplified manner and certain elements of the switching regulator, such as the LC filter circuit, are omitted to simplify the discussion. It is understood that the switching regulator 140 may include other elements to complete the circuit. Furthermore, it is understood that the switching regulator 140 may be implemented using other switching regulator configurations. The specific configuration of the switching regulator is not critical to the practice of the present invention.

Referring to FIG. 6, a switching regulator 140 is configured to drive a load 30. The switching regulator 140 includes a switching regulator controller ("controller") 142 driving a power stage 20 providing a regulated output voltage Vout on node 26. A feedback voltage Vfb (node 28), indicative of the regulated output voltage Vout, is provided to the error amplifier 14 in the controller 142 to be compared with the reference voltage Vref (node 164). The feedback voltage Vfb can be the regulated output voltage Vout or a divided down voltage of the regulated output voltage Vout. The error signal generated by the error amplifier 14 is digitized by the ADC 15 and the digitized error signal Verr is then provided to the loop calculator 17 to generate the PWM control signal (node 19). The loop calculator 17 can be implemented as a PID calculator and a PWM generator, as shown in FIG. 1. The PWM control signal is provided to drive the power stage 20 to generate the regulated output voltage Vout. In operation, the control loop of the switching regulator operates to achieve the operating point where the error signal Verr is zero. That is, the control loop modulates the PWM control signal to turn the power stage on and off until the feedback voltage Vfb is the same as the reference voltage Vref.

In switching regulator 140, the reference voltage Vref has a voltage value related to a set voltage Vset (node 13). The set voltage Vset can be a voltage value set by electronic system or a predetermined output voltage value for the switching regulator 140. In embodiments of the present invention, the controller 142 includes an output voltage adjust circuit 150 to generate a voltage adjust signal Vos (node 112). The voltage adjust signal Vos is combined with the set voltage Vset to generate the reference voltage Vref which is relative to the set voltage. In FIG. 6, a summer 11 is shown for summing the voltage adjust signal Vos and the set voltage Vset. The use of a summer 11 is illustrative only and not intended to be limiting. In actual implementation, any circuitry for combining two voltage values may be used. In actual implementation, the voltage adjust signal Vos may be combined with the set voltage Vset by increasing or decreasing the set voltage Vset by an amount indicated by the voltage adjust signal Vos.

More specifically, the output voltage adjust circuit 150 receives a sense current signal Isens (node 104) indicative of the load current $I_{Load}$ flowing through the load 30. In the present embodiment, the sense current signal Isens is digitized by an ADC 106 and the digitized sense current signal Isens' (node 108) is provided to the output voltage adjust circuit 150. The digitized sense current signal Isens' may also be provided to the loop calculator 17 for determining the PWM control signal.

The output voltage adjust circuit 150 provides the voltage adjust signal Vos in response to the sense current Isens or the digitized sample thereof. In the present embodiment, the output voltage adjust circuit 150 is implemented as a set of current-voltage lookup tables. In some embodiments, each current-voltage lookup table 152 in the set of lookup tables is associated with a predetermined load profile. That is, each current-voltage lookup table 152 stores voltage values for the voltage adjust signal that are designed for a certain type of load, where each voltage value is associated with a sense current value. In one embodiment, the current-voltage lookup tables 152 are referred to as application-specific current-voltage lookup tables. That is, each current-voltage lookup table 152 is associated with a predetermined user application, such as applications App1 to AppN. Some examples of user applications include ASICS (application specific integrated circuits), microprocessors, FPGAs (field programmable gate arrays), GPUs (graphics processing unit), and network processors. These different applications may have different load profile. The current-voltage lookup table 152 may store the voltage values for the voltage adjust signal that are designed for each specific type of these applications as the load.

To select one of the current-voltage lookup tables, the output voltage adjust circuit 150 includes an input select circuit 154 and an output select circuit 156, both responsive to a select signal received on a communication interface 60. The input select circuit 154 selects one of the current-voltage lookup tables 152 in response to the select signal. The selected current-voltage lookup table 152 is indexed by the digitized sense current value Isens' and the selected current-voltage lookup table provides an output voltage value corresponding to the digitized sense current value. The output select circuit 156 selects the current-voltage lookup table 152 in response to the select signal and provides the output voltage value as the voltage adjust signal Vos on node 162. In this manner, a current-voltage lookup table having the desired load profile is selected and the selected current-voltage lookup table is responsive to the load current demand and adjusts the regulated output voltage accordingly. As a result, real time or on-the-fly output voltage adjustment can be realized. Furthermore, the regulated output voltage can be adjusted dynamically for optimizing power consumption without interaction from the load or the system processor.

In some embodiments, the input select circuit 154 is implemented as a multiplexer circuit and the output select circuit 156 is implemented as a demultiplexer circuit.

In the present embodiment, the communication interface 60 can also be configured to receive input data to update load data into the lookup tables or to update data values stored in the lookup tables. In one embodiment, the communication interface is implemented as a power management bus (PM-Bus).

In embodiments of the present invention, the output voltage adjust circuit implements current pattern matching to enable predictive voltage adjustments. In some embodiments, the output voltage adjust circuit detects for repetitive current pattern and adjusts the regulated output voltage to the minimum voltage value in response to the repetitive current pattern to optimize energy consumption. In other embodiments, the output voltage adjust circuit detects for identical shape current pattern and adjusts the regulated output voltage to the minimum voltage value in response to the identical shape current pattern to optimize energy consumption.

Figure 7:
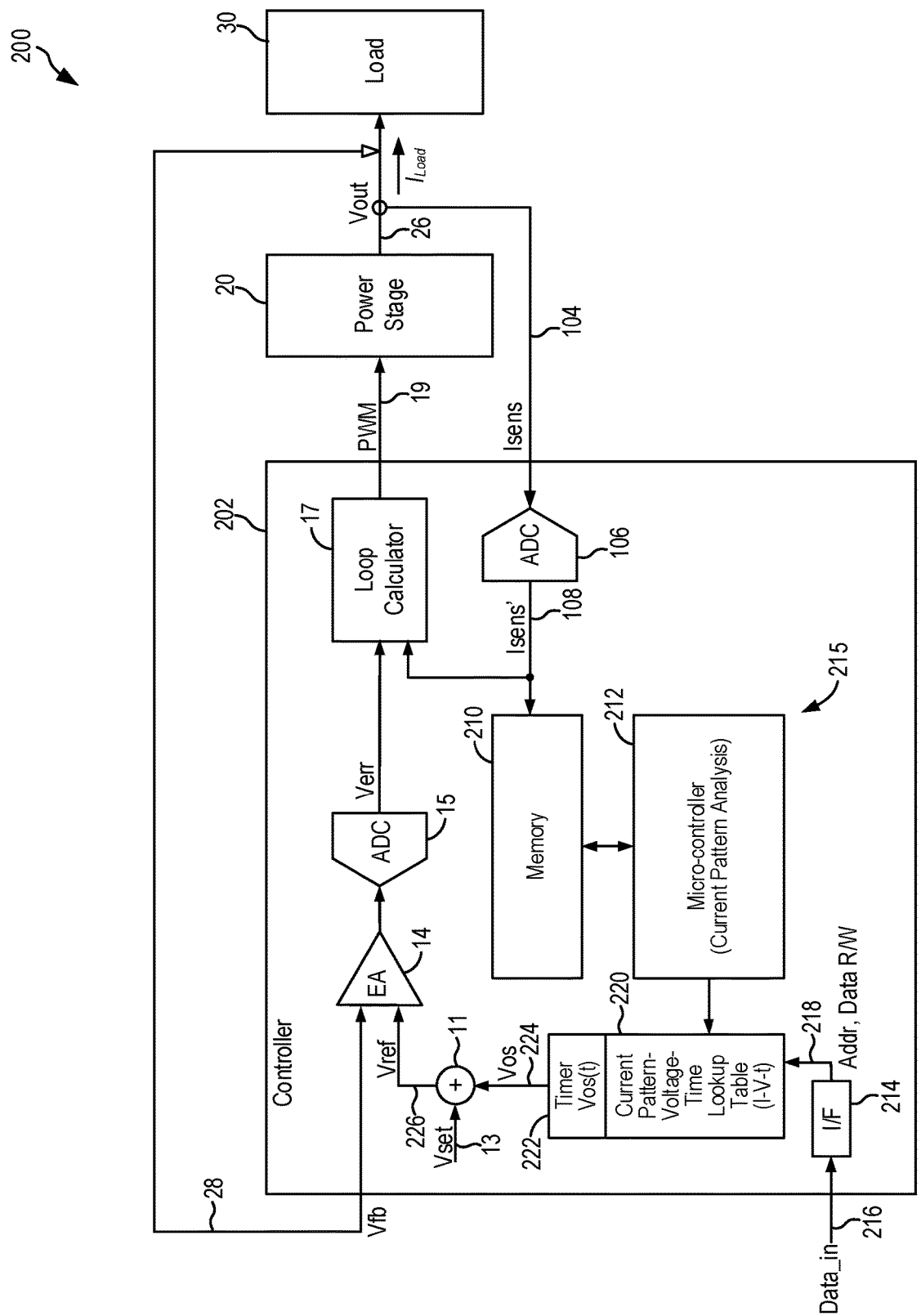
FIG. 7 is a schematic diagram of a switching regulator controller incorporating an output voltage adjust circuit for dynamic output voltage adjustment in some embodiments of the present invention.

FIG. 7 is a schematic diagram of a switching regulator controller incorporating an output voltage adjust circuit for dynamic output voltage adjustment in some embodiments of the present invention. In general, the switching regulator 200 in FIG. 7 is constructed in the same manner as the switching regulator 100 of FIG. 5. Like elements in FIGS. 5 and 7 are giving like reference numerals and discussion of like elements may be omitted. The switching regulator 200 in FIG. 7 is illustrated in a simplified manner and certain elements of the switching regulator, such as the LC filter circuit, are omitted to simplify the discussion. It is understood that the switching regulator 200 may include other elements to complete the circuit. Furthermore, it is understood that the switching regulator 200 may be implemented using other switching regulator configurations. The specific configuration of the switching regulator is not critical to the practice of the present invention.

Referring to FIG. 7, a switching regulator 200 is configured to drive a load 30. The switching regulator 200 includes a switching regulator controller ("controller") 202 driving a power stage 20 providing a regulated output voltage Vout on node 26. A feedback voltage Vfb (node 28), indicative of the regulated output voltage Vout, is provided to the error amplifier 14 in the controller 202 to be compared with the reference voltage Vref (node 226). The feedback voltage Vfb can be the regulated output voltage Vout or a divided down voltage of the regulated output voltage Vout. The error signal generated by the error amplifier 14 is digitized by the ADC 15 and the digitized error signal Verr is then provided to the loop calculator 17 to generate the PWM control signal (node 19). The loop calculator 17 can be implemented as a PID calculator and a PWM generator, as shown in FIG. 1. The PWM control signal is provided to drive the power stage 20 to generate the regulated output voltage Vout. In operation, the control loop of the switching regulator operates to achieve the operating point where the error signal Verr is zero. That is, the control loop modulates the PWM control signal to turn the power stage on and off until the feedback voltage Vfb is the same as the reference voltage Vref.

In switching regulator 202, the reference voltage Vref has a voltage value related to a set voltage Vset (node 13). The set voltage Vset can be a voltage value set by electronic system or a predetermined output voltage value for the switching regulator 200. In embodiments of the present invention, the controller 202 includes an output voltage adjust circuit 215 to generate a voltage adjust signal Vos (node 224). The voltage adjust signal Vos is combined with the set voltage Vset to generate the reference voltage Vref which is relative to the set voltage. In FIG. 7, a summer 11 is shown for summing the voltage adjust signal Vos and the set voltage Vset. The use of a summer 11 is illustrative only and not intended to be limiting. In actual implementation, any circuitry for combining two voltage values may be used. In actual implementation, the voltage adjust signal Vos may be combined with the set voltage Vset by increasing or decreasing the set voltage Vset by an amount indicated by the voltage adjust signal Vos.

More specifically, the output voltage adjust circuit 215 receives a sense current signal Isens (node 104) indicative of the load current $I_{Load}$ flowing through the load 30. In the present embodiment, the sense current signal Isens is digitized by an ADC 106 and the digitized sense current signal Isens' (node 108) is provided to the output voltage adjust circuit 215. The digitized sense current signal Isens' may also be provided to the loop calculator 17 for determining the PWM control signal.

The output voltage adjust circuit 215 provides the voltage adjust signal Vos in response to the sense current Isens or the digitized sample thereof. In the present embodiment, the output voltage adjust circuit 215 implements current pattern analysis and matching. The output voltage adjust circuit 215 includes a memory 210 for storing sense current samples and also for storing current patterns, a micro-controller 212 for analyzing the sense current samples, a current pattern-voltage lookup table 220 providing output voltage values, and a timer 222 providing timing control for the voltage adjust signal. In embodiments of the present invention, the microcontroller 212 can be a shared element in controller 202. That is, the controller 202 typically includes a micro-controller for operation control. The output voltage adjust circuit 215 can share the same micro-controller and uses the free time of the micro-controller to perform sense current pattern analysis. A dedicated micro-controller is not needed for the output voltage adjust circuit.

The memory 210 stores incoming digitized sense current samples Isens'. For example, one Isens' sample is stored for every switching cycle ($t_{SW}$) of the switching regulator. The micro-controller 212 receives the digitized sense current samples and performs pattern detection analysis to detect for pattern in the digitized sense current samples. In some embodiments, the micro-controller 212 analyzes the digitized sense current samples to detect for a repetitive pattern in the current samples over time. In one embodiment, the micro-controller 212 uses a Fast Fourier Transform (FFT) algorithm to identify patterns in the current samples. In other embodiments, other pattern detection algorithms can be used. When the micro-controller 212 detects a repetitive current pattern in the samples, the detected current pattern is stored in memory 210.

Once a repetitive current pattern is detected, the micro-controller 212 also provides the detected current pattern to the current pattern-voltage lookup table 220. The current pattern-voltage lookup table 220, indexed by the detected current pattern, provides output voltage pattern corresponding to the detected current pattern. In general, for a given current pattern, a lower output voltage value is used when the load current is decreasing and a higher output voltage value is used when the load current is increasing. In embodiments of the present invention, a repeated current pattern can be used to index the current pattern-voltage lookup table 220. In particular, the shape of the repeated current pattern can be used to identify the current pattern and to index the lookup table. The repeated current pattern may be occurring at a regular timing interval. Alternately, the repeated current pattern may be occurring at an irregular or random timing intervals. The micro-controller 212 detects the occurrence of the repeated current pattern and applies the detected current pattern to index the current pattern-voltage lookup table 220.

In some embodiments, the output voltage pattern may include segments of voltage values. In some embodiments, the current pattern-voltage lookup table 220 also provides time values for each segment of voltage values forming the output voltage pattern. The output voltage pattern and the associated time values are provided to a timer 222. The timer 222 provides the voltage values for the time durations indicated by the associated time values as the voltage adjust signal Vos (node 224). In this manner, dynamic output voltage adjustment is realized in switching regulator 200 using load current pattern recognition.

In other embodiments, the memory 210 stores sense current patterns and the micro-controller 212 analyzes the digitized sense current samples to detect for a pattern in the current samples matching a stored current pattern in the memory. The stored current patterns can be repetitive current patterns previously detected by the micro-controller 212. Alternately, the stored current patterns can also be predefined and stored into memory 210. The micro-controller 212 analyzes incoming digitized sense current samples to identify current pattern matching a stored current pattern. Once identified, the micro-controller 212 then provides the identified current pattern to the current pattern-voltage lookup table 220 to index the output voltage pattern.

In embodiments of the present invention, the current pattern-voltage lookup table 220 stores output voltage pattern corresponding to sense current pattern. The lookup table sets a given voltage value for a given current value, within a given voltage range limit. For example, when the current value is low, such as 10A, the output voltage can be set to 1V; and when the current value is high, such as 50A, the output voltage can be set to 1.5V. The output voltage value to be used for a given current value can be predefined by a user or predefined for a given load profile, such as through the communication interface 214. The communication interface 214 can also be used to set up the lookup table 220 or to update the data values in the lookup table 220. In one embodiment, the communication interface is implemented as a power management bus (PMBus).

In one embodiment, the current pattern-voltage lookup table 220 stores the output voltage pattern as segments of voltage values, each segment having a given time value. In another embodiment, the micro-controller 212 determines the repetition period of a current pattern and the repetition period is stored with the current pattern in the lookup table 220. The lookup table 220 provides the repetitive current pattern at the repetition period as the voltage adjust signal. Once a repetitive current pattern is identified, the repetitive current pattern can be run continuously to adjust the regulated output voltage on a continuous basis.

Figure 8:
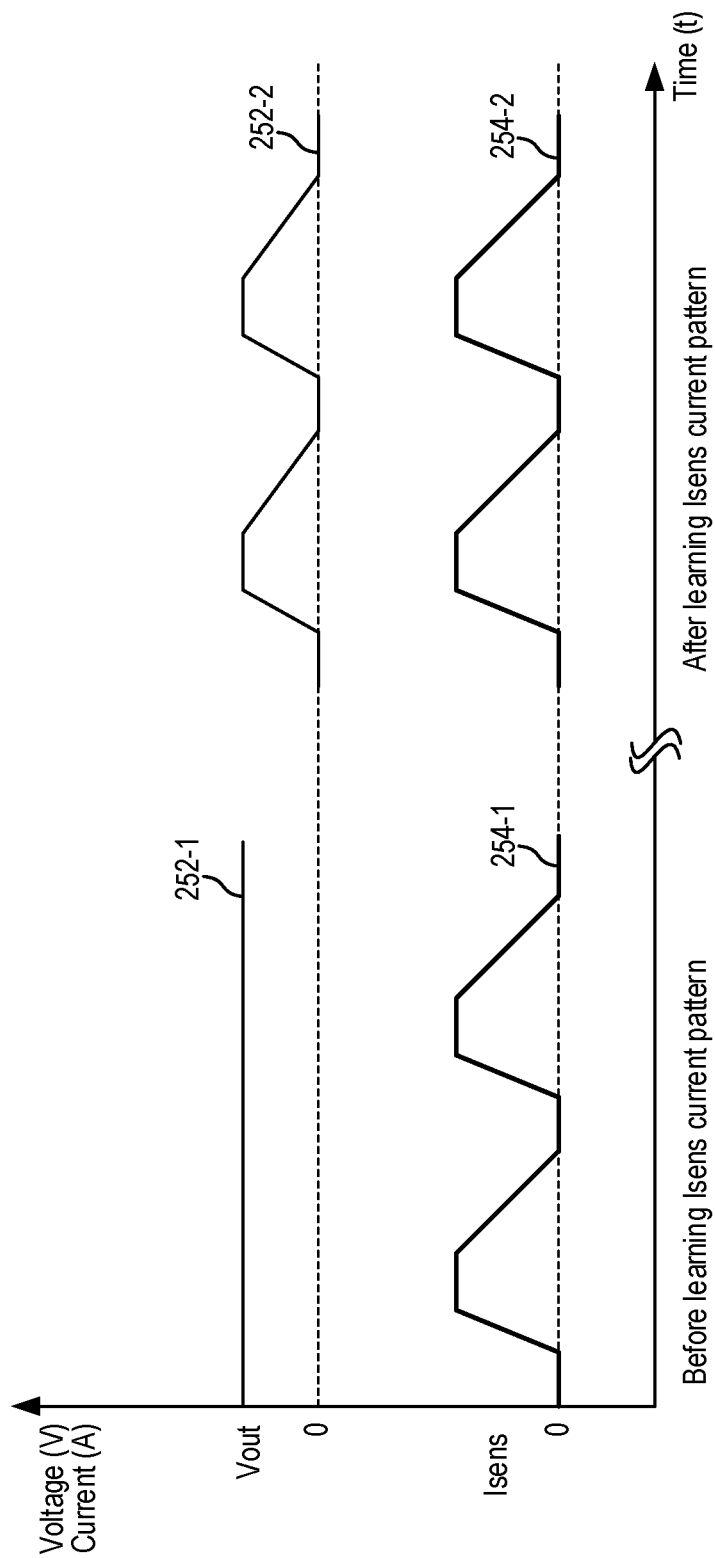
FIG. 8 is a plot illustrating the operation of the current pattern analysis and matching in the switching regulator controller of FIG. 7 in some examples.

FIG. 8 is a plot illustrating the operation of the current pattern analysis and matching in the switching regulator controller of FIG. 7 in some examples. Referring to FIG. 8, before learning a sense current pattern, the switching regulator 200 provides a regulated output voltage Vout that is unmodulated (curve 252-1). Using a unmodulated output voltage leads to undesired energy consumption as the load current, represented by sense current Isens (curve 254-1), varies over time indicating varying load current demand over time. Maintaining a fixed regulated output voltage Vout while the load current demand varies leads to inefficient power consumption. In embodiments of the present invention, the switching regulator controller 202 is configured to analyze and learn the current pattern of the sense current over time. Thus, after learning the current pattern of the sense current (curve 254-2), a voltage adjust signal corresponding to the detected current pattern is provided by the current pattern-voltage lookup table. The switching regulator controller 202 modulates the regulated output voltage Vout (curve 252-2) in response to the voltage adjust signal so that the regulated output voltage varies dynamically with the load current demand. As a result, the power consumption is optimized as the output voltage of the switching regulator is modulated in accordance with the load current demand.

Figure 9:
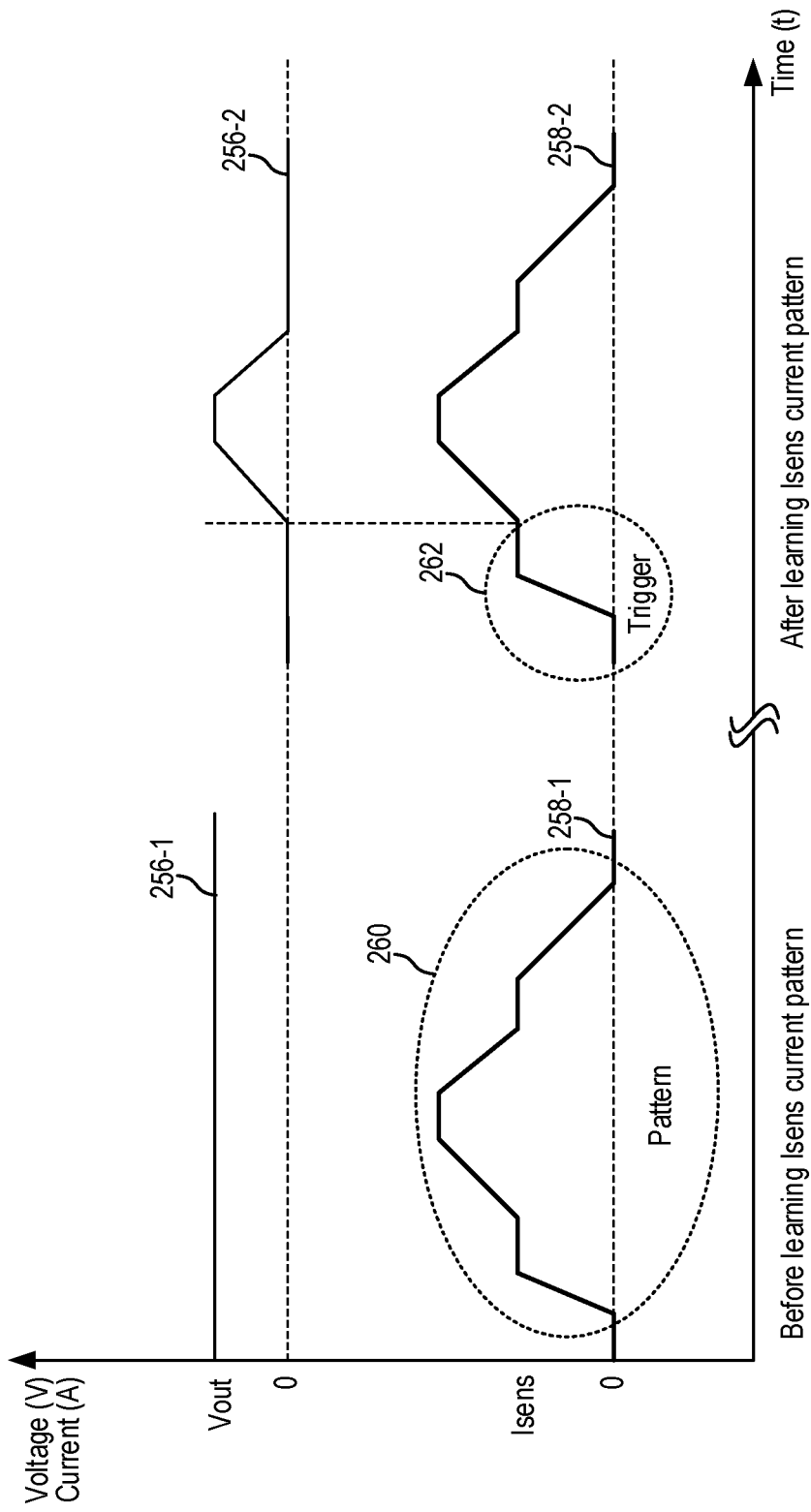
FIG. 9 is a plot illustrating the use of a current pattern trigger in the switching regulator controller of FIG. 7 in some examples.

In some embodiments of the present invention, the microcontroller 212 is configured to detect a current pattern which is used as a trigger to apply an output voltage pattern as the voltage adjust signal. The current pattern used as trigger can be the leading portion of a repetitive current pattern. FIG. 9 is a plot illustrating the use of a current pattern trigger in the switching regulator controller of FIG. 7 in some examples. Referring to FIG. 9, before learning a sense current pattern, the switching regulator 200 provides a regulated output voltage Vout that is unmodulated (curve 256-1). Using a unmodulated output voltage leads to undesired energy consumption as the load current, represented by sense current Isens (curve 258-1), varies over time indicating varying load current demand over time. Maintaining a fixed regulated output voltage Vout while the load current demand leads to inefficient power consumption.

In embodiments of the present invention, the switching regulator controller 202 is configured to analyze and learn the current pattern of the sense current over time. In particular, the controller 202 learns the current pattern 260 but stores the leading portion 262 of the current pattern 260 as a trigger pattern. The controller 202 also associates an output voltage pattern to the trigger pattern. After learning the trigger pattern, when the controller 202 detects the trigger pattern in the incoming sense current samples (curve 258-2), the controller 202 indexes the current pattern-voltage lookup table to provide the output voltage pattern as the voltage adjust signal. The switching regulator controller 202 modulates the regulated output voltage Vout (curve 256-2) in response to the voltage adjust signal so that the regulated output voltage varies dynamically with the load current demand. As a result, the power consumption is optimized as the output voltage of the switching regulator is modulated in accordance with the load current demand.

Figure 10:
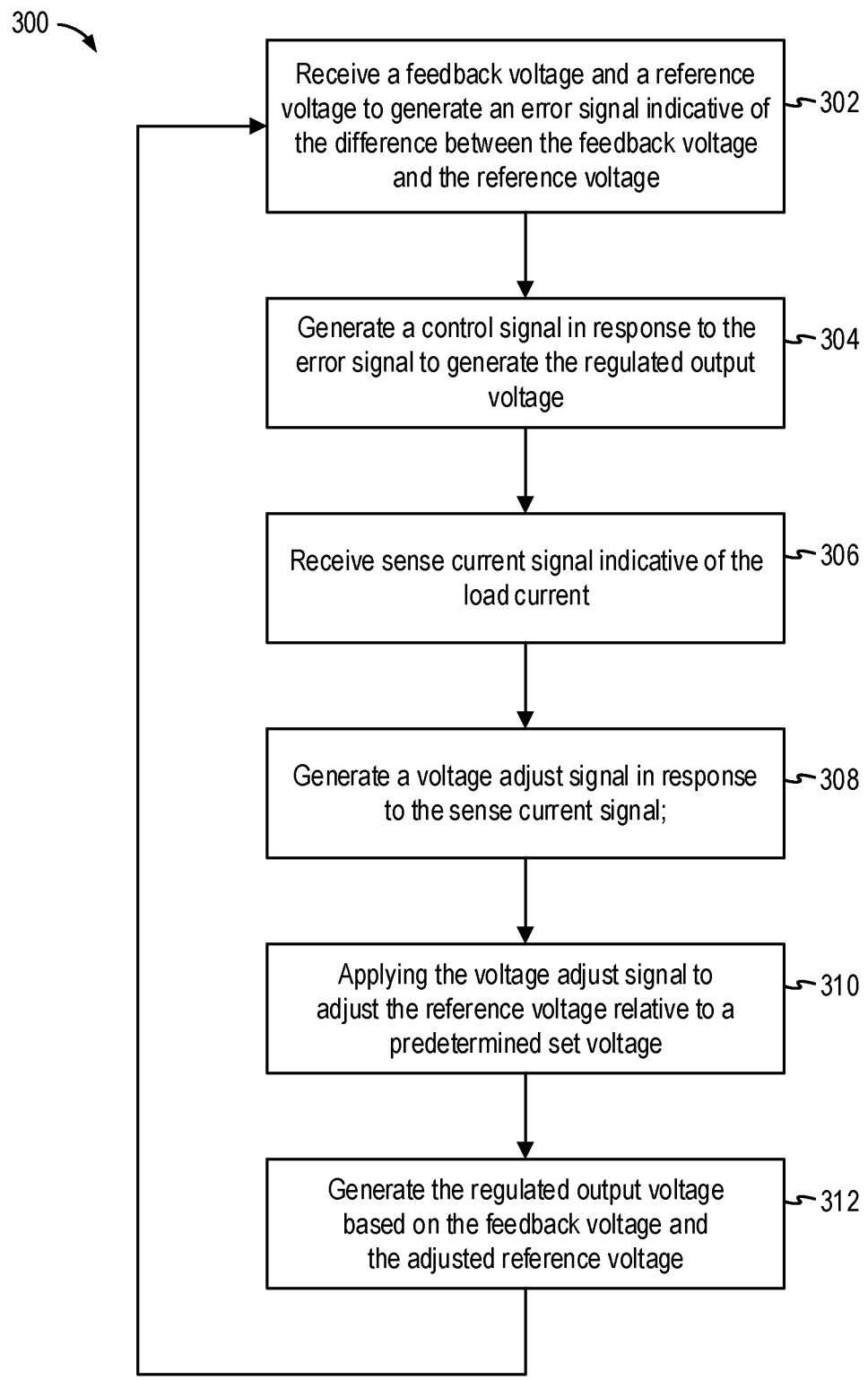
FIG. 10 is a flowchart illustrating a dynamic output voltage adjustment method in a switching regulator in some embodiments.

FIG. 10 is a flowchart illustrating a dynamic output voltage adjustment method in a switching regulator in some embodiments. Referring to FIG. 10, a method 300 starts by receiving a feedback voltage and a reference voltage to generate an error signal indicative of the difference between the feedback voltage and the reference voltage (302). The method 300 then generates a control signal in response to the error signal to generate the regulated output voltage (304). The method 300 receives a sense current signal indicative of the load current (306). The method 300 generates a voltage adjust signal in response to the sense current signal (308). The method 300 applies the voltage adjust signal to adjust the reference voltage relative to a predetermined set voltage (310). The method 300 then generates the regulated output voltage based on the feedback voltage and the adjusted reference voltage (312).

Figure 11:
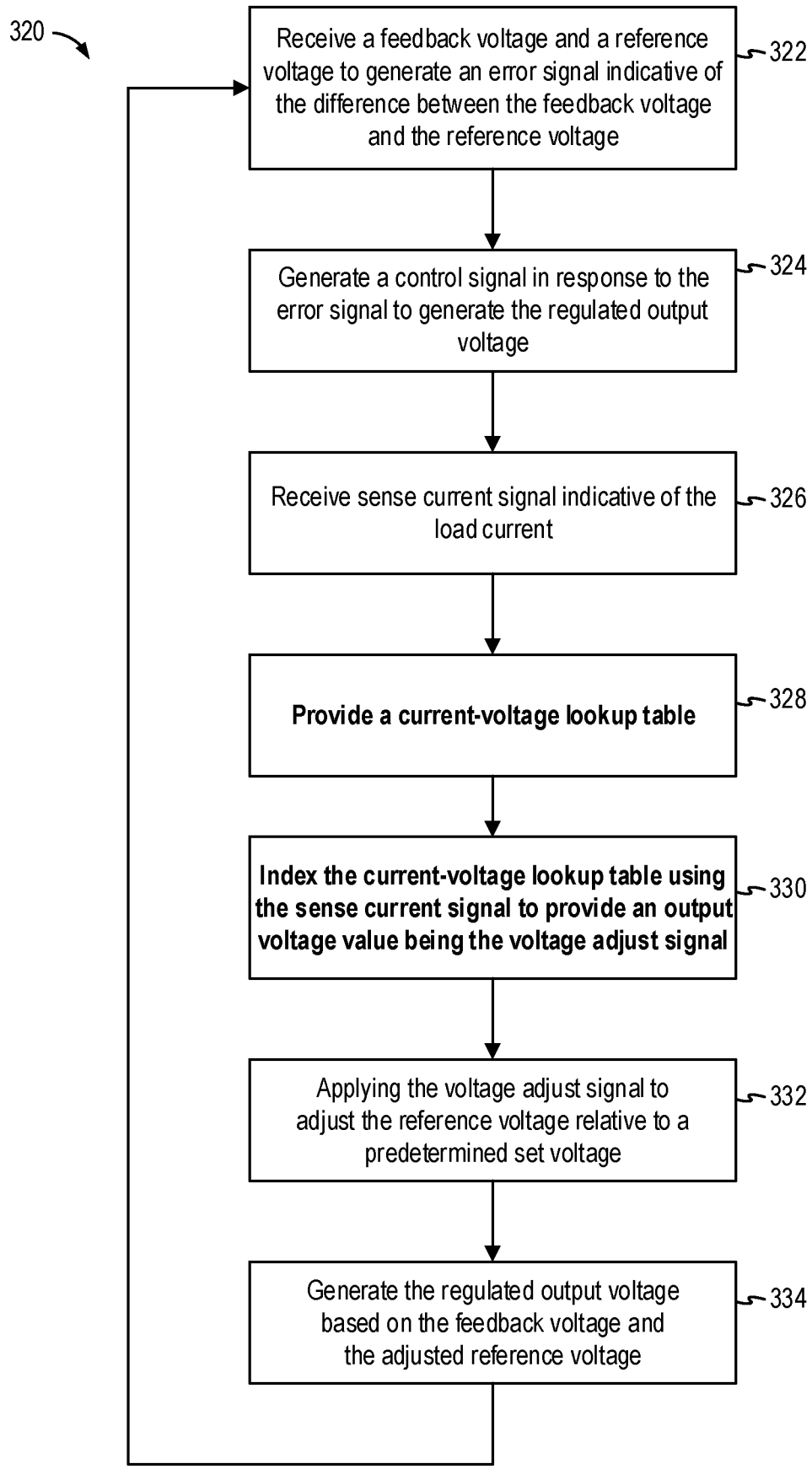
FIG. 11 is a flowchart illustrating a dynamic output voltage adjustment method in a switching regulator in some embodiments.

FIG. 11 is a flowchart illustrating a dynamic output voltage adjustment method in a switching regulator in some embodiments. Referring to FIG. 11, a method 320 starts by receiving a feedback voltage and a reference voltage to generate an error signal indicative of the difference between the feedback voltage and the reference voltage (322). The method 320 then generates a control signal in response to the error signal to generate the regulated output voltage (324). The method 320 receives a sense current signal indicative of the load current (326). The method 320 provides a current-voltage lookup table (328). The current-voltage lookup table contains output voltage values indexed to sense current values. The method 320 then index the current-voltage lookup table using the sense current signal to provide an output voltage value being the voltage adjust signal (330). The method 320 applies the voltage adjust signal to adjust the reference voltage relative to a predetermined set voltage (332). The method 320 then generates the regulated output voltage based on the feedback voltage and the adjusted reference voltage (334).

Figure 12:
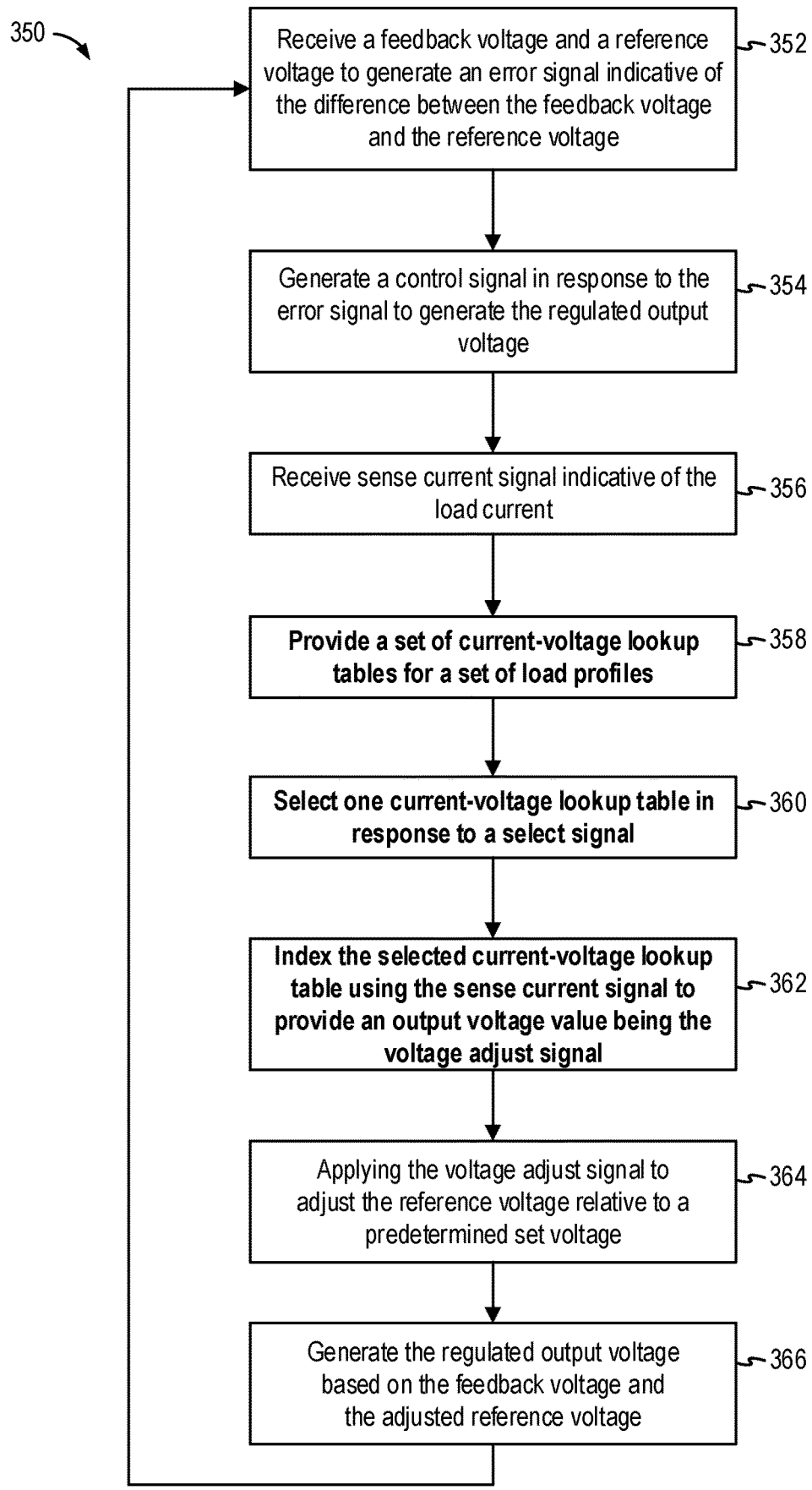
FIG. 12 is a flowchart illustrating a dynamic output voltage adjustment method in a switching regulator in some embodiments.

FIG. 12 is a flowchart illustrating a dynamic output voltage adjustment method in a switching regulator in some embodiments. Referring to FIG. 12, a method 350 starts by receiving a feedback voltage and a reference voltage to generate an error signal indicative of the difference between the feedback voltage and the reference voltage (352). The method 350 then generates a control signal in response to the error signal to generate the regulated output voltage (354). The method 350 receives a sense current signal indicative of the load current (356). The method 350 provides a set of current-voltage lookup tables (358). Each current-voltage lookup table contains output voltage values indexed to sense current values and is associated with a predetermined load profile. The method 350 then selects one current-voltage lookup table in response to a select signal (360). The method 350 indexes the selected current-voltage lookup table using the sense current signal to provide an output voltage value being the voltage adjust signal (362). The method 350 applies the voltage adjust signal to adjust the reference voltage relative to a predetermined set voltage (364). The method 350 then generates the regulated output voltage based on the feedback voltage and the adjusted reference voltage (366).

Figure 13:
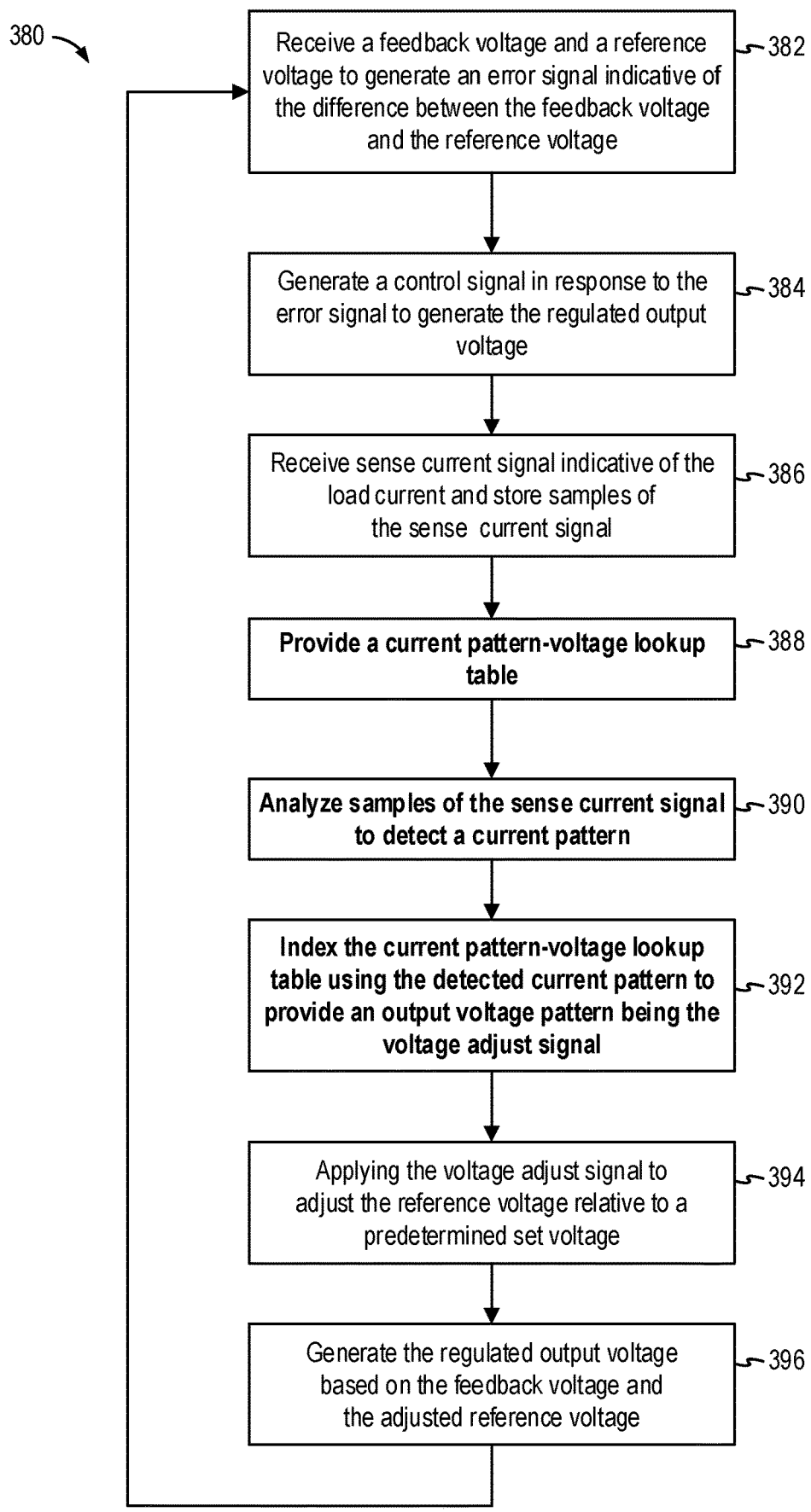
FIG. 13 is a flowchart illustrating a dynamic output voltage adjustment method in a switching regulator in some embodiments.

FIG. 13 is a flowchart illustrating a dynamic output voltage adjustment method in a switching regulator in some embodiments. Referring to FIG. 13, a method 380 starts by receiving a feedback voltage and a reference voltage to generate an error signal indicative of the difference between the feedback voltage and the reference voltage (382). The method 380 then generates a control signal in response to the error signal to generate the regulated output voltage (384). The method 380 receives a sense current signal indicative of the load current and stores samples of the sense current signal (386). The method 380 provides a current pattern-voltage lookup table (388). The current pattern-voltage lookup table contains output voltage values indexed to sense current patterns. The method 380 then analyzes samples of the sense current signal to detect a current pattern (390). The method 380 indexes the current pattern-voltage lookup table using the detected current pattern to provide an output voltage pattern being the voltage adjust signal (392). The method 380 applies the voltage adjust signal to adjust the reference voltage relative to a predetermined set voltage (394). The method 380 then generates the regulated output voltage based on the feedback voltage and the adjusted reference voltage (396).

Figure 14:
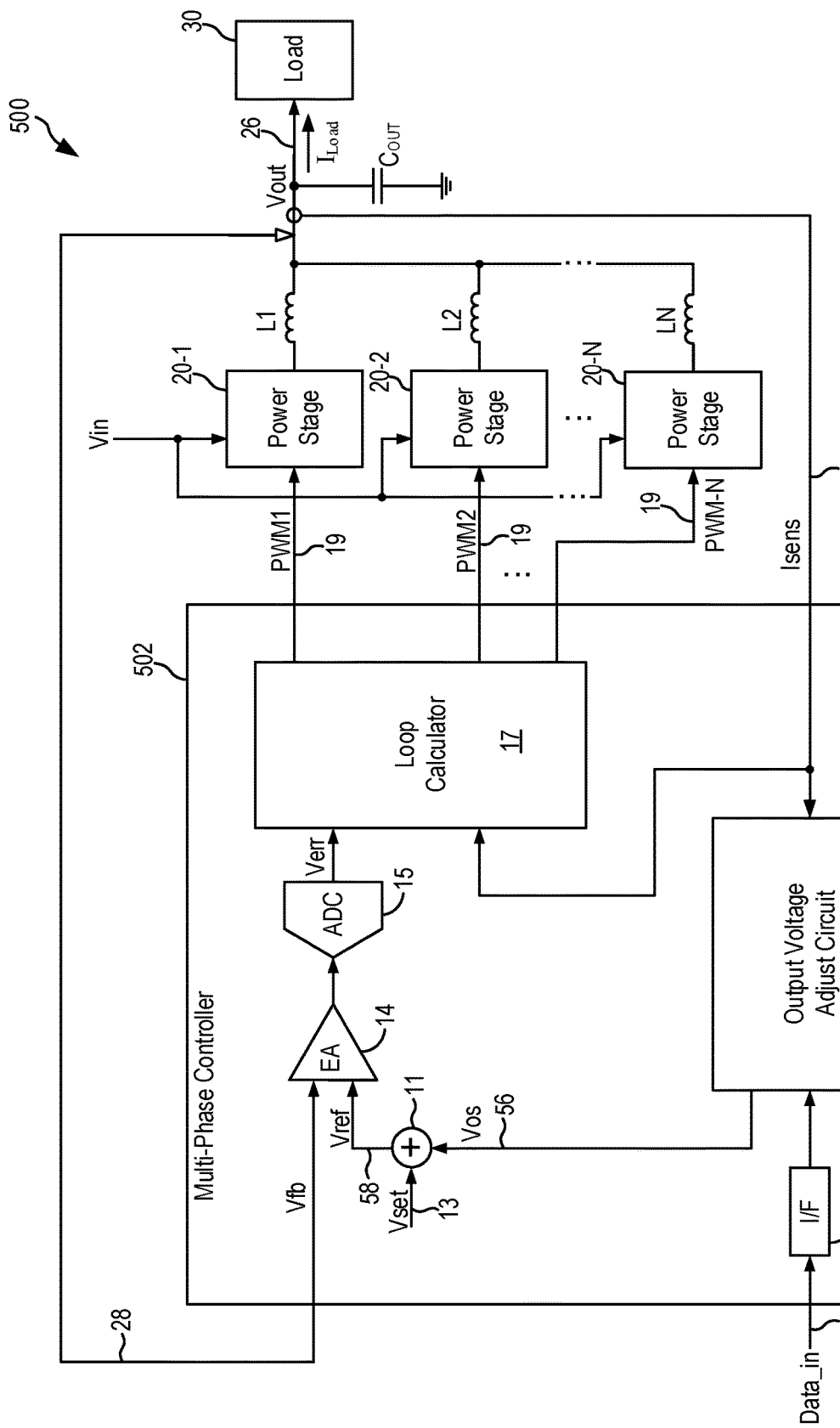
FIG. 14 is a schematic diagram of a multiphase switching regulator incorporating an output voltage adjust circuit in some embodiments of the present invention.

In the above described embodiments, the dynamic output voltage adjustment circuit and method is applied to a single-phase switching regulator controller. In embodiments of the present invention, the dynamic output voltage adjustment circuit and method can be applied to a multiphase controller for controlling a multiphase switching regulator. FIG. 14 is a schematic diagram of a multiphase switching regulator incorporating an output voltage adjust circuit in some embodiments of the present invention Like elements in FIGS. 4 and 14 are giving like reference numerals and discussion of like elements may be omitted. A multiphase switching regulator 500 consists of paralleled power stages driving a common load. The switching signals for each of the power stages are out of phase with each other. For example, one power stage might be opening a switch while another is closing a switch. Each power stage continues to operate on the same clock frequency. A multiphase controller 502 is used to control the multiple power stages in multi-phase operation. The dynamic output voltage adjustment circuit 520 and associated method described above can be applied to a multiphase controller to modulate the regulated output voltage in response to a sense current indicative of the load current supplying the common load, in the same manner as described above with reference to FIG. 4. Furthermore, the current-voltage lookup table of FIG. 5 or the application-specific current-voltage lookup table of FIG. 6 can be applied in a multiphase controller to regulate the regulated output voltage. Also, output voltage adjustment using current pattern matching, as described in FIG. 7, can also be applied in a multiphase controller. Finally, the dynamic output voltage adjustment methods described with reference to FIGS. 10 to 13 can be applied to a single-phase switching regulator controller or a multi-phase switching regulator controller.

The present disclosure can be implemented in numerous ways, including as a process; an apparatus; a system; a composition of matter; a computer program product embodied on a computer readable storage medium; and/or a processor, such as a hardware processor or a processor device configured to execute instructions stored on and/or provided by a memory coupled to the processor. In this specification, these implementations, or any other form that the present disclosure may take, may be referred to as techniques. In general, the order of the steps of disclosed processes may be altered within the scope of the present disclosure. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the present disclosure is provided above along with accompanying figures that illustrate the principles of the present disclosure. The present disclosure is described in connection with such embodiments, but the present disclosure is not limited to any embodiment. The scope of the present disclosure is limited only by the claims and the present disclosure encompasses numerous alternatives, modifications and equivalents. Numerous specific details are set forth in the following description in order to provide a thorough understanding of the present disclosure. These details are provided for the purpose of example and the present disclosure may be practiced according to the claims without some or all of these specific details. For the purpose of clarity, technical material that is known in the technical fields related to the present disclosure has not been described in detail so that the present disclosure is not unnecessarily obscured.

The above detailed descriptions are provided to illustrate specific embodiments of the present invention and are not intended to be limiting. Numerous modifications and variations within the scope of the present invention are possible. The present invention is defined by the appended claims.

What is claimed is:

1. A controller for a switching regulator, the switching regulator configured to receive an input voltage and to generate a regulated output voltage on an output terminal for driving a load, the controller comprising:
   an error amplifier configured to receive a feedback voltage indicative of the regulated output voltage and a reference voltage, and to generate an error signal indicative of the difference between the feedback voltage and the reference voltage;
   a loop calculator configured to generate an output signal in response to the error signal, the output signal being used by the switching regulator to generate the regulated output voltage having a voltage value related to the reference voltage; and
   an output voltage adjust circuit configured to receive a sense current signal sensing a load current flowing through the load and to generate a voltage adjust signal in response to the sense current signal, the output voltage adjust circuit comprises a memory storing a current-voltage lookup table, the current-voltage lookup table containing a set of voltage values indexed to corresponding sense current signal values, the voltage values and the sense current signal values being associated with a predetermined load profile of the load and the current-voltage lookup table providing an output voltage value responsive to load current demand,
   wherein the current-voltage lookup table is indexed by a value of the sense current signal to provide the output voltage value being the voltage adjust signal, the voltage adjust signal being applied to generate the reference voltage relative to a predetermined set voltage to increase or decrease the reference voltage, the reference voltage being applied to the error amplifier to generate the error signal; and
   wherein the voltage adjust signal is summed with the predetermined set voltage to generate the reference voltage.

2. The controller of claim 1, wherein the loop calculator is configured to generate the output signal in response to the error signal and the sense current signal.

3. The controller of claim 1, further comprising:
   a first analog-to-digital converter coupled to receive the error signal from the error amplifier and to generate a digitized error signal, wherein the loop calculator is configured to generate the output signal in response to the digitized error signal.

4. The controller of claim 1, further comprising:
   a second analog-to-digital converter coupled to receive the sense current signal and to generate a digitized sense current signal, wherein the current-voltage lookup table is indexed by the digitized sense current signal to provide the output voltage value.

5. The controller of claim 1, further comprising:
   an interface configured to receive input data and to update the current-voltage lookup table in response to the input data.

6. The controller of claim 1, wherein:
the memory in the output voltage adjust circuit comprises a memory storing a plurality of current-voltage lookup tables, each current-voltage lookup table containing a set of voltage values indexed to corresponding sense current signal values, each current-voltage lookup table being associated with a given load profile; and
the output voltage adjust circuit further comprises an interface configured to receive an input data signal and to provide an input selection signal to the memory, wherein the input selection signal is applied to the memory to select one current-voltage lookup table from the plurality of current-voltage lookup tables and the selected current-voltage lookup table is indexed by a value of the sense current signal to provide an output voltage value being the voltage adjust signal.

7. The controller of claim 6, further comprising:
a second analog-to-digital converter coupled to receive the sense current signal and to generate a digitized sense current signal, wherein the selected current-voltage lookup table is indexed by the digitized sense current signal to provide the output voltage value.

8. The controller of claim 6, wherein the interface is further configured to receive input data and to update the plurality of current-voltage lookup tables in response to the input data.

9. The controller of claim 6, wherein the plurality of current-voltage lookup tables comprises a first current-voltage lookup table for a load having a first profile and a second current-voltage lookup table for a load having a second profile different from the first profile.

10. The controller of claim 6, wherein the memory further comprises:
an input select circuit configured to select one of the current-voltage lookup tables in response to the input selection signal and to provide the sense current signal to the selected current-voltage lookup table; and
an output select circuit configured to select the output voltage value from the selected current-voltage lookup table in response to the input selection signal.

11. A controller for a switching regulator, the switching regulator configured to receive an input voltage and to generate a regulated output voltage on an output terminal for driving a load, the controller comprising:
an error amplifier configured to receive a feedback voltage indicative of the regulated output voltage and a reference voltage, and to generate an error signal indicative of the difference between the feedback voltage and the reference voltage;
a loop calculator configured to generate an output signal in response to the error signal, the output signal being used by the switching regulator to generate the regulated output voltage having a voltage value related to the reference voltage; and
an output voltage adjust circuit configured to receive a sense current signal sensing a load current flowing through the load and to generate a voltage adjust signal in response to the sense current signal, the voltage adjust signal being applied to generate the reference voltage relative to a predetermined set voltage,
wherein the output voltage adjust circuit comprises:
a memory configured to store one or more samples of the sense current signal and further configured to store a current pattern-voltage lookup table; and
a processor configured to receive the one or more samples of the sense current signal and to analyze the samples to detect a repetitive current pattern in the samples, the repetitive current pattern being associated with a shape of the sense current signal, the processor generating a pattern output in response to the repetitive current pattern being detected in the samples,
wherein the current pattern-voltage lookup table is indexed by the detected repetitive current pattern to provide an output voltage pattern being the voltage adjust signal, the voltage adjust signal being applied to generate the reference voltage relative to the predetermined set voltage to increase or decrease the reference voltage, wherein the voltage adjust signal is summed with the predetermined set voltage to generate the reference voltage.

12. The controller of claim 11, further comprising:
a second analog-to-digital converter coupled to receive the sense current signal and to generate a digitized sense current signal, wherein the memory stores the digitized sense current signal as the samples of the sense current signal and the processor analyzes the samples of the digitized sense current signal to detect the repetitive current pattern.

13. The controller of claim 11, further comprising:
an interface configured to receive input data and to update the current pattern-voltage lookup table in response to the input data.

14. The controller of claim 11, further comprising:
a timer circuit configured to receive an output voltage value associated with a segment of the output voltage pattern and a time value for the segment from the current pattern-voltage lookup table and to provide the output voltage value as the voltage adjusted output signal for a time duration of the time value.

15. The controller of claim 11, wherein the processor detects a first current pattern and the current pattern-voltage lookup table is indexed by the first current pattern to provide an output voltage pattern corresponding to the first current pattern.

16. The controller of claim 11, wherein the processor detects a second current pattern and provides at least a portion of the second current pattern as the index for the current pattern-voltage lookup table, the current pattern-voltage lookup table being indexed by the portion of the second current pattern to provide an output voltage pattern corresponding to the second current pattern.

17. The controller of claim 11, wherein the processor detects the repetitive current pattern in the samples of the sense current signal as the current pattern.

18. The controller of claim 11, wherein the processor detects the repetitive current pattern in the samples of the sense current signal as the current pattern, and in response to the processor detecting the repetitive current pattern, the current pattern-voltage lookup table is indexed by the processor to provide an output voltage pattern corresponding to the repetitive current pattern as the voltage adjusted output signal, the output voltage pattern being provided continuously in a repetitive pattern corresponding to the repetitive current pattern.

19. The controller of claim 11, wherein the processor detects the repetitive current pattern using a Fast Fourier Transform.

20. A method in a controller for a switching regulator, the switching regulator configured to receive an input voltage and to generate a regulated output voltage on an output terminal for driving a load, the method comprising:
receiving a feedback voltage indicative of the regulated output voltage and a reference voltage;

generating an error signal indicative of the difference between the feedback voltage and the reference voltage;
generating a control signal in response to at least the error signal, the control signal being used to generate the regulated output voltage having a voltage value related to the reference voltage;
receiving a sense current signal sensing a load current flowing through the load;
providing a current-voltage lookup table containing a set of voltage values indexed to corresponding sense current signal values, the voltage values and the sense current signal values being associated with a predetermined load profile of the load and the current-voltage lookup table providing an output voltage value responsive to load current demand;
generating a voltage adjust signal in response to the sense current signal by indexing the current-voltage lookup table using a value of the sense current signal to provide the output voltage value being the voltage adjust signal;
applying the voltage adjust signal to adjust the reference voltage relative to a predetermined set voltage to increase or decrease the reference voltage by summing the voltage adjust signal with the predetermined set voltage to generate the reference voltage; and
generating the regulated output voltage based on the feedback voltage and the adjusted reference voltage.

21. The method of claim 20, wherein generating the voltage adjust signal in response to the sense current signal comprises:

providing a plurality of current-voltage lookup tables, each current-voltage lookup table containing a set of voltage values indexed to corresponding sense current signal values and being associated with a respective load profile;
receive an input selection signal;
selecting one current-voltage lookup table from the plurality of current-voltage lookup tables in response to the input selection signal; and
indexing the selected current-voltage lookup table using a value of the sense current signal to provide an output voltage value being the voltage adjust signal.

22. The method of claim 20, wherein generating the voltage adjust signal in response to the sense current signal comprises:

providing a current pattern-voltage lookup table;
storing one or more samples of the sense current signal in a memory;
receiving, at a processor, the one or more samples of the sense current values;
analyzing the samples to detect a current pattern in the samples, the current pattern being associated with a shape of the sense current signal;
generating a pattern output in response to a current pattern being detected in the samples;
indexing the current pattern-voltage lookup table using the detected current pattern to provide an output voltage pattern being the voltage adjust signal.

* * * * *